US008861959B2

(12) United States Patent
Tian et al.

(10) Patent No.: US 8,861,959 B2
(45) Date of Patent: Oct. 14, 2014

(54) RECEIVING APPARATUS, SENDING APPARATUS, SYSTEM AND METHOD FOR OPTICAL POLARIZATION DIVISION MULTIPLEXING

(75) Inventors: Dafeng Tian, Chengdu (CN); Zhiyu Xiao, Chengdu (CN); Xiaogeng Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 277 days.

(21) Appl. No.: 13/453,696

(22) Filed: Apr. 23, 2012

(65) Prior Publication Data

US 2012/0207475 A1 Aug. 16, 2012

Related U.S. Application Data

(63) Continuation of application No. PCT/CN2010/077987, filed on Oct. 22, 2010.

(30) Foreign Application Priority Data

Oct. 23, 2009 (CN) .......................... 2009 1 0205452

(51) Int. Cl.
*H04J 14/08* (2006.01)
*H04B 10/04* (2006.01)
(Continued)

(52) U.S. Cl.
CPC ............ *H04J 14/06* (2013.01); *H04B 10/0779* (2013.01); *H04B 10/5561* (2013.01); *H04B 10/69* (2013.01); *H04B 10/671* (2013.01); *H04B 10/532* (2013.01); *H04J 14/0276* (2013.01)
USPC .............................. 398/65; 398/184; 398/205

(58) Field of Classification Search
CPC ............. H04B 10/0779; H04B 10/532; H04B 10/5561; H04B 10/671; H04B 10/69; H04J 14/06; H04J 14/0276; H04J 14/02
USPC ........................................... 398/65, 184, 205
See application file for complete search history.

(56) References Cited

U.S. PATENT DOCUMENTS 5,111,322 A 5/1992 Bergano et al.
5,867,291 A 2/1999 Wu et al.
(Continued)

FOREIGN PATENT DOCUMENTS

CN 1235721 A 11/1999
CN 1734312 A 2/2006
(Continued)

OTHER PUBLICATIONS

Written Opinion of the International Searching Authority in corresponding International Patent Application No. PCT/CN2010/077987 (Jan. 27, 2011).

(Continued)

*Primary Examiner* — Ken Vanderpuye
*Assistant Examiner* — Abbas H Alagheband
(74) *Attorney, Agent, or Firm* — Leydig, Voit & Mayer, Ltd.

(57) ABSTRACT

The present invention discloses a receiving apparatus, a sending apparatus, a system and a method for optical polarization division multiplexing. The receiving apparatus includes: an optical splitter, configured to: split a received polarization-multiplexed optical signal into two identical polarization-multiplexed optical signals, where the two polarization-multiplexed optical signals both include a first State Of Polarization (SOP) optical signal and a second SOP optical signal, and the first SOP optical signal is an optical signal when a horizontal-SOP optical signal is transmitted to the optical splitter, and the second SOP optical signal is an optical signal when a vertical-SOP optical signal is transmitted to the optical splitter; a horizontal optical signal obtaining apparatus, connected to the optical splitter and configured to separate the horizontal-SOP optical signal; and a vertical optical signal obtaining apparatus, connected to the optical splitter and configured to separate the vertical-SOP optical signal.

4 Claims, 11 Drawing Sheets

(51) Int. Cl.
*H04B 10/12* (2006.01)
*H04B 10/06* (2006.01)
*H04B 10/077* (2013.01)
*H04B 10/556* (2013.01)
*H04B 10/69* (2013.01)
*H04B 10/67* (2013.01)
*H04B 10/532* (2013.01)
*H04J 14/06* (2006.01)
*H04J 14/02* (2006.01)

(56) References Cited

U.S. PATENT DOCUMENTS

| | | | |
|---|---|---|---|
| 6,580,535 B1 | 6/2003 | Schoenfelder | |
| 6,634,808 B2* | 10/2003 | Glingener | 398/65 |
| 6,771,910 B1 | 8/2004 | Napier et al. | |
| 6,894,780 B2* | 5/2005 | Tucker | 356/364 |
| 7,082,268 B2* | 7/2006 | Schemmann et al. | 398/158 |
| 7,110,677 B2* | 9/2006 | Reingand et al. | 398/98 |
| 7,127,166 B2* | 10/2006 | Glingener | 398/65 |
| 7,194,211 B2* | 3/2007 | Schemmann et al. | 398/183 |
| 7,224,906 B2* | 5/2007 | Cho et al. | 398/183 |
| 7,343,100 B2* | 3/2008 | Yao | 398/152 |
| 7,414,728 B2* | 8/2008 | Caplan | 356/477 |
| 7,599,627 B2* | 10/2009 | Schemmann et al. | 398/183 |
| 7,620,326 B2* | 11/2009 | Glingener | 398/152 |
| 7,697,849 B2* | 4/2010 | Kamio et al. | 398/204 |
| 7,853,157 B2* | 12/2010 | Grigoryan et al. | 398/203 |
| 8,014,686 B2* | 9/2011 | Rahn et al. | 398/205 |
| 8,107,827 B2* | 1/2012 | Schmidt et al. | 398/205 |
| 8,244,138 B2* | 8/2012 | Hoshida et al. | 398/152 |
| 8,265,483 B2* | 9/2012 | Saperstein et al. | 398/65 |
| 8,582,981 B2* | 11/2013 | Akiyama et al. | 398/188 |
| 2002/0191256 A1* | 12/2002 | Schemmann et al. | 359/161 |
| 2003/0058504 A1* | 3/2003 | Cho et al. | 359/161 |
| 2003/0147646 A1* | 8/2003 | Zitelli | 398/65 |
| 2003/0175033 A1* | 9/2003 | Taga et al. | 398/152 |
| 2003/0202798 A1 | 10/2003 | Chou et al. | |
| 2003/0206676 A1 | 11/2003 | Ovadia et al. | |
| 2005/0265727 A1* | 12/2005 | Glingener | 398/152 |
| 2005/0265728 A1* | 12/2005 | Yao | 398/152 |
| 2006/0228118 A1* | 10/2006 | Schemmann et al. | 398/184 |
| 2006/0274320 A1* | 12/2006 | Caplan | 356/491 |
| 2007/0009264 A1* | 1/2007 | Kamio et al. | 398/102 |
| 2008/0080872 A1* | 4/2008 | Tanaka et al. | 398/186 |
| 2008/0159758 A1* | 7/2008 | Shpantzer et al. | 398/214 |
| 2008/0232816 A1* | 9/2008 | Hoshida et al. | 398/152 |
| 2009/0169208 A1* | 7/2009 | Grigoryan et al. | 398/65 |
| 2009/0274469 A1* | 11/2009 | Yuki et al. | 398/152 |
| 2010/0021166 A1* | 1/2010 | Way | 398/79 |
| 2010/0054737 A1* | 3/2010 | Saperstein et al. | 398/65 |
| 2010/0316393 A1* | 12/2010 | Schmidt et al. | 398/205 |

FOREIGN PATENT DOCUMENTS

| | | |
|---|---|---|
| JP | 62277828 A | 12/1987 |
| JP | 2004304444 A | 10/2004 |

OTHER PUBLICATIONS

Chinese Search Report in corresponding Chinese Patent Application No. 2009102054522 (Jan. 7, 2013).

International Search Report in corresponding International Patent Application No. PCT/CN2010/077987 (Jan. 27, 2011).

Extended European Search Report in corresponding European Patent Application No. 10824473.2 (Aug. 27, 2012).

* cited by examiner

RECEIVING APPARATUS, SENDING APPARATUS, SYSTEM AND METHOD FOR OPTICAL POLARIZATION DIVISION MULTIPLEXING

CROSS-REFERENCE TO RELATED APPLICATIONS

This application is a continuation of International Application No. PCT/CN2010/077987, filed on Oct. 22, 2010, which claims priority to Chinese Patent Application No. 200910205452.2, filed on Oct. 23, 2009, both of which are hereby incorporated by reference in their entireties.

FIELD OF THE INVENTION

The present invention relates to the field of technologies of optical polarization division multiplexing, and in particular, to a receiving apparatus, a sending apparatus, a system and a method for optical polarization division multiplexing.

BACKGROUND OF THE INVENTION

With the diversification and development of network applications, the bearing rate of main lines of an optical transmission network increases from 10 gigabits per second (Gb/s) and 40 Gb/s to 100 Gb/s. The 100 Gb/s optical transmission systems will become a mainstream of the next-generation optical network.

Currently, the optical transmission system with a line rate of 100 Gb/s is generally realized through a polarization multiplexing system. The polarization multiplexing system modulates two data source signals of 56 Gb/s to two optical signals, which have mutually orthogonal states of polarization, respectively at a sending end, and a polarization beam combiner (PBC) combines the two optical signals into one polarization-multiplexed optical signal. The polarization-multiplexed optical signal carries data of 112 Gb/s, and is sent to an optical fiber link for transmission.

A receiving end of the polarization multiplexing system uses a polarization controller (PC) to control the state of polarization (SOP) of the received polarization-multiplexed optical signal, and compensate for and rectify the loss and change of the SOP introduced on the optical fiber link. A polarized light separating apparatus such as a polarization beam splitter (PBS) or a polarization detector obtains single-SOP polarized light. The system that uses an optical device to implement polarization demultiplexing at the receiving end is called an optical transmission system for optical polarization division multiplexing.

FIG. 1 is a schematic structural diagram of an optical transmission system for optical polarization division multiplexing in the prior art. The system is a 112 Gb/s optical transmission system implemented through Differential Quadrature Phase Shift Keying (DQPSK) modulation, polarization multiplexing, and optical polarization division multiplexing.

The input data sources in FIG. 1 are four 28 Gb/s electric signals: D1, D2, D3, and D4. At a sending end, every two data signals (electric signals) are modulated onto the optical signal through a DQPSK modulator, where D1 and D2 are modulated onto an optical signal Y, and D3 and D4 are modulated onto an optical signal X. The optical signal Y and optical signal X are generated after a light source of the same laser is split by a coupler. The optical signal Y and optical signal X are both single-SOP optical signals, and SOPs thereof are mutually orthogonal, as shown in FIG. 2 and FIG. 3. In this way, the optical signal Y and optical signal X bear 56 Gb/s data respectively. The optical signal Y and optical signal X are combined by a PBC into a polarization-multiplexed optical signal, which is sent onto an optical fiber link for transmission. The SOPs of the optical signal Y and optical signal X before and after the combination are as shown in FIG. 3. The polarization-multiplexed optical signal obtained through combination bears 112 Gb/s data.

Upon arriving at the receiving end, the polarization-multiplexed optical signal is processed by a feedback control loop including a PC, a PBS, an optical splitter, a feedback quantity extracting module, and a search track module. The PC rotates the SOP, and the PBS outputs two pieces of single-SOP polarized light. In this way, the optical polarization division multiplexing is realized. The feedback quantity extracting module includes a radio frequency (RF) detecting module or a pilot detecting module. That is, the RF is used as a feedback quantity to control the PC to adjust the SOP, or the pilot is used as a feedback quantity to control the PC to adjust the SOP. When the pilot is used as a feedback quantity, the polarization multiplexing sending end needs to add a controllable attenuator or modulator to scramble the optical signal X or optical signal Y.

A change of SOP of the polarization-multiplexed optical signal is as shown in FIG. 4. Two SOPs of the optical signal at the sending end are mutually orthogonal. When the optical signal is transmitted through an optical fiber link, because of various types of loss and interference on the link, the two SOPs of the optical signal arriving at the receiving end are not orthogonal any more. The receiving end outputs a control quantity according to a feedback signal found and tracked, and uses the output control quantity to control the PC to adjust the SOP of the received polarization-multiplexed optical signal. The feedback signal extracted by the feedback quantity extracting module may be pilot information added into the optical signal Y or crosstalk power of the optical signal X in the optical signal Y. The search track module in the feedback loop controls, on a basis of a maximum feedback quantity or a minimum feedback quantity, the PC in real time to make the feedback quantity maximum or minimum. That is, the search track module makes the PC rotate the whole polarization-multiplexed optical signal until the optical signal X is deflected to a horizontal direction or the optical signal Y is deflected to a vertical direction. It can be seen from FIG. 4 that, when the PC adjusts the SOP until the optical signal X is deflected to the horizontal direction, the PBS filters out an optical signal X' of the horizontal SOP and an optical signal Y' of the vertical SOP so that the optical polarization division multiplexing is realized. The optical signal X' is superimposition of the optical signal X and a component of the optical signal Y in the horizontal direction, and the optical signal Y' is a component of the optical signal Y in the vertical direction. Conversely, when the PC adjusts the SOP until the optical signal Y is deflected to the vertical direction, an optical signal Y' is superimposition of the optical signal Y and a component of the optical signal X in the vertical direction, and an optical signal X' is a component of the optical signal X in the horizontal direction.

In the process of implementing the present invention, the inventor finds at least the following defects in the prior art: The optical signal output from the same output port of the PBS is not fixed, and may be an optical signal X' or an optical signal Y'; the separated optical signal X' includes the component of the optical signal Y in the vertical direction, namely, the output optical signal X' includes the component of the optical signal Y; or the separated optical signal Y' includes the component of the optical signal X. Crosstalk is noticeable and affects the performance of the optical transmission system.

SUMMARY OF THE INVENTION

Embodiments of the present invention discloses a receiving apparatus, a sending apparatus, a system and a method for optical polarization division multiplexing, so as to reduce crosstalk in optical signals at a receiving end of optical polarization division multiplexing.

An embodiment of the present invention provides a receiving apparatus for optical polarization division multiplexing, which includes:

an optical splitter, configured to: split a received polarization-multiplexed optical signal into two identical polarization-multiplexed optical signals, where the two identical polarization-multiplexed optical signals both include a first SOP optical signal and a second SOP optical signal respectively, and where the first SOP optical signal is an optical signal when a horizontal-SOP optical signal is transmitted to the optical splitter, and the second SOP optical signal is an optical signal when a vertical-SOP optical signal is transmitted to the optical splitter;

a horizontal optical signal obtaining apparatus, connected to the optical splitter, and configured to: adjust a SOP of one of the two polarization-multiplexed optical signals until the second SOP optical signal in the polarization-multiplexed optical signal is adjusted to the vertical direction, and separate a horizontal-SOP optical signal from the adjusted polarization-multiplexed optical signal; and a vertical optical signal obtaining apparatus, connected to the optical splitter, and configured to: adjust a SOP of the other of the two polarization-multiplexed optical signals until the first SOP optical signal in the other polarization-multiplexed optical signal is adjusted to the horizontal direction, and separate a vertical-SOP optical signal from the adjusted polarization-multiplexed optical signal.

An embodiment of the present invention also provides a sending apparatus for optical polarization division multiplexing, which includes:

a driver, configured to amplify a data signal;

an integrated modulator, configured to modulate the amplified data signal onto an optical signal;

a bias point control unit, configured to control a working state of the integrated modulator;

a pilot control unit, configured to send a pilot signal so as to enable at least one of the driver and the bias point control unit to load the pilot signal into the optical signal modulated by the integrated modulator.

An embodiment of the present invention further provides an optical transmission system for optical polarization division multiplexing, which includes the foregoing receiving apparatus for optical polarization division multiplexing and the foregoing sending apparatus for optical polarization division multiplexing.

An embodiment of the present invention further provides a receiving method for optical polarization division multiplexing, which includes:

receiving a polarization-multiplexed optical signal, where the polarization-multiplexed optical signal includes a first SOP optical signal and a second SOP optical signal, the first SOP optical signal is an optical signal when a horizontal-SOP optical signal is transmitted to an optical splitter, and the second SOP optical signal is an optical signal when a vertical-SOP optical signal is transmitted to the optical splitter;

splitting, by the optical splitter, the received polarization-multiplexed optical signal into two identical polarization-multiplexed optical signals;

adjusting a SOP of one of the two polarization-multiplexed optical signals until the second SOP optical signal in the one polarization-multiplexed optical signal is adjusted to the vertical direction, and separating a horizontal-SOP optical signal from the adjusted polarization-multiplexed optical signal; and adjusting a SOP of the other one of the two polarization-multiplexed optical signals until the first SOP optical signal in the other polarization-multiplexed optical signal is adjusted to the horizontal direction, and separating a vertical-SOP optical signal from the adjusted polarization-multiplexed optical signal.

An embodiment of the present invention also provides a sending method for optical polarization division multiplexing. which includes:

amplifying a data signal; and modulating the amplified data signal onto a polarization-multiplexed optical signal, where the polarization-multiplexed optical signal is loaded with a pilot signal, the pilot signal is loaded onto the polarization-multiplexed optical signal through at least one of a driver and a bias point control unit.

In the foregoing embodiments, the horizontal optical signal obtaining apparatus and the vertical optical signal obtaining apparatus both adjust the SOP of the optical signal orthogonal to the SOP of the optical signal to be separated to the before-sending state, so as to separate the single-SOP optical signal respectively, which mitigates the impact caused by Polarization Dependent Loss (PDL) on the transmission link, reduces the crosstalk of optical signals, and improves the performance of the optical transmission system for optical polarization division multiplexing.

The technical solutions of the present invention are further descried in detail below with reference to accompanying drawings and exemplary embodiments.

DETAILED DESCRIPTION OF THE EMBODIMENTS

Figure 5:
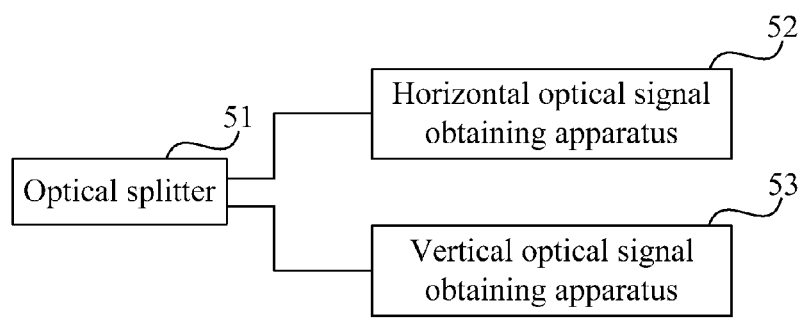
FIG. 5 is a schematic structural diagram of a receiving apparatus for optical polarization division multiplexing provided by an embodiment of the present invention.

FIG. 5 is a schematic structural diagram of a receiving apparatus for optical polarization division multiplexing provided by an embodiment of the present invention. The system includes an optical splitter 51, a horizontal optical signal obtaining apparatus 52, and a vertical optical signal obtaining apparatus 53. The optical splitter 51 is configured to split a received polarization-multiplexed optical signal into two identical polarization-multiplexed optical signals. The two polarization-multiplexed optical signals both include a first SOP optical signal and a second SOP optical signal respectively, where the first SOP optical signal is an optical signal when an SOP optical signal in a horizontal direction is transmitted to the optical splitter, and the second SOP optical signal is an optical signal when an SOP optical signal in a vertical direction is transmitted to the optical splitter. After the horizontal-SOP optical signal is transmitted through an optical fiber link, an SOP deviates from the horizontal direction, and the optical signal becomes the first SOP optical signal that carries the same data as the horizontal-SOP optical signal. Similarly, after the vertical-SOP optical signal is transmitted along an optical fiber link, an SOP deviates from the vertical direction, and the optical signal becomes the second SOP optical signal that carries the same data as the vertical-SOP optical signal. The horizontal optical signal obtaining apparatus 52 is connected to the optical splitter 51, and is configured to: adjust a SOP of one of the two polarization-multiplexed optical signals until the second SOP optical signal in the polarization-multiplexed optical signal is adjusted to the vertical direction, and separate a horizontal-SOP optical signal from the adjusted polarization-multiplexed optical signal. The vertical optical signal obtaining apparatus 53 is connected to the optical splitter 51, and is configured to: adjust a SOP of the other one of the two polarization-multiplexed optical signals until the first SOP optical signal in the polarization-multiplexed optical signal is adjusted to the horizontal direction, and separate a vertical-SOP optical signal from the adjusted polarization-multiplexed optical signal.

The horizontal optical signal obtaining apparatus 52 may include a first PC, a first polarized light separating apparatus, a first optical splitter, a first feedback quantity extracting module, and a first search track module, which make up a feedback loop. The first polarized light separating apparatus may be a PBS or a polarization detector.

The first PC is configured to adjust the SOP of the polarization-multiplexed optical signal until the second SOP optical signal in the polarization-multiplexed optical signal is adjusted to the vertical direction.

The first polarized light separating apparatus is configured to separate the horizontal-SOP optical signal from the adjusted polarization-multiplexed optical signal.

The first optical splitter is configured to split the optical signal separated by the first polarized light separating apparatus into two signals.

The first feedback quantity extracting module includes a first RF power extracting submodule and a first pilot extracting submodule. The first pilot extracting submodule is configured to extract a pilot signal from one optical signal separated by the first optical splitter; and the first RF power extracting submodule is configured to extract RF power from the other optical signal separated by the first optical splitter.

The first search track module is configured to identify the first SOP optical signal according to the pilot signal extracted by the first pilot extracting submodule, and control, according to an identification result and the RF power extracted by the first RF power extracting submodule, the first PC to adjust the SOP of the polarization-multiplexed optical signal.

Figure 1:
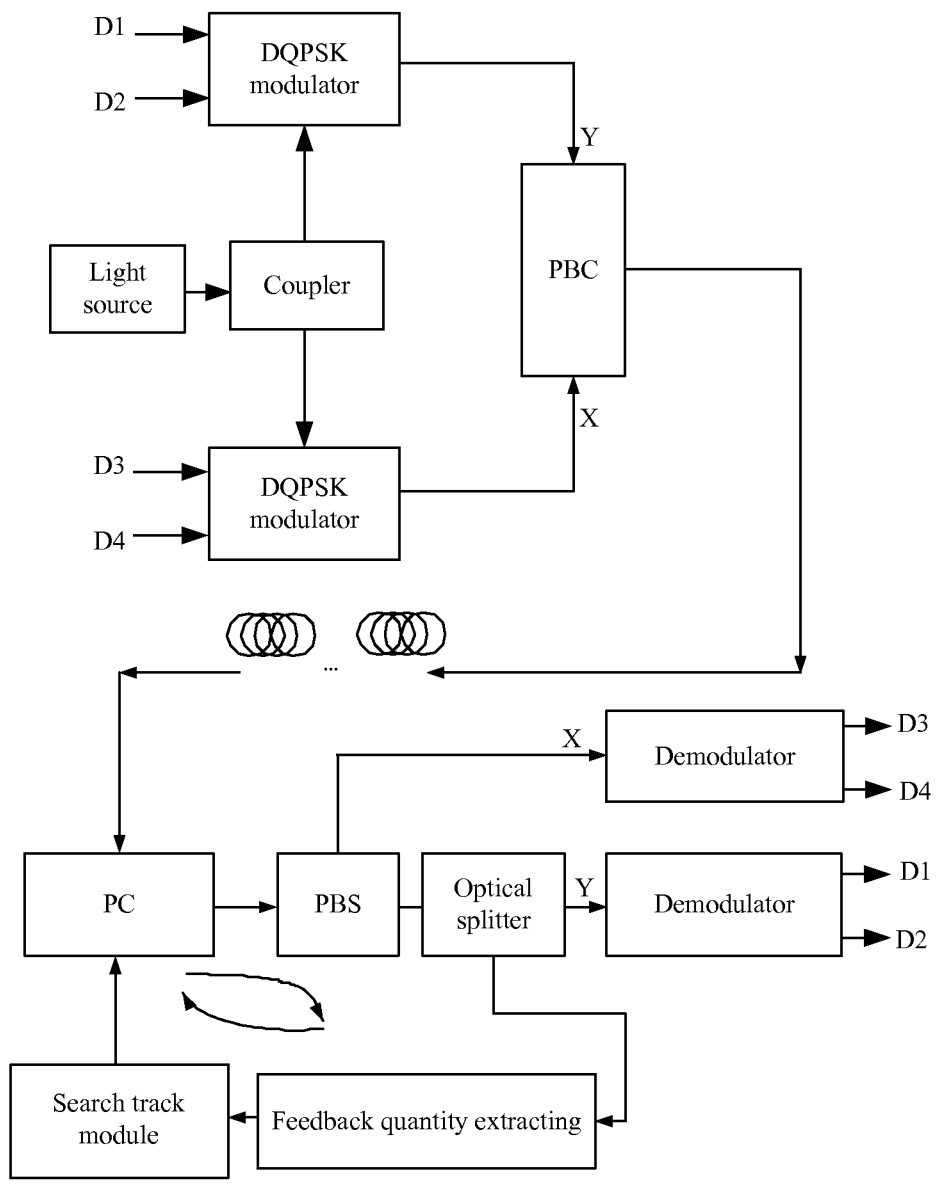
FIG. 1 is a schematic structural diagram of an optical transmission system for optical polarization division multiplexing in the prior art.
Figure 2:
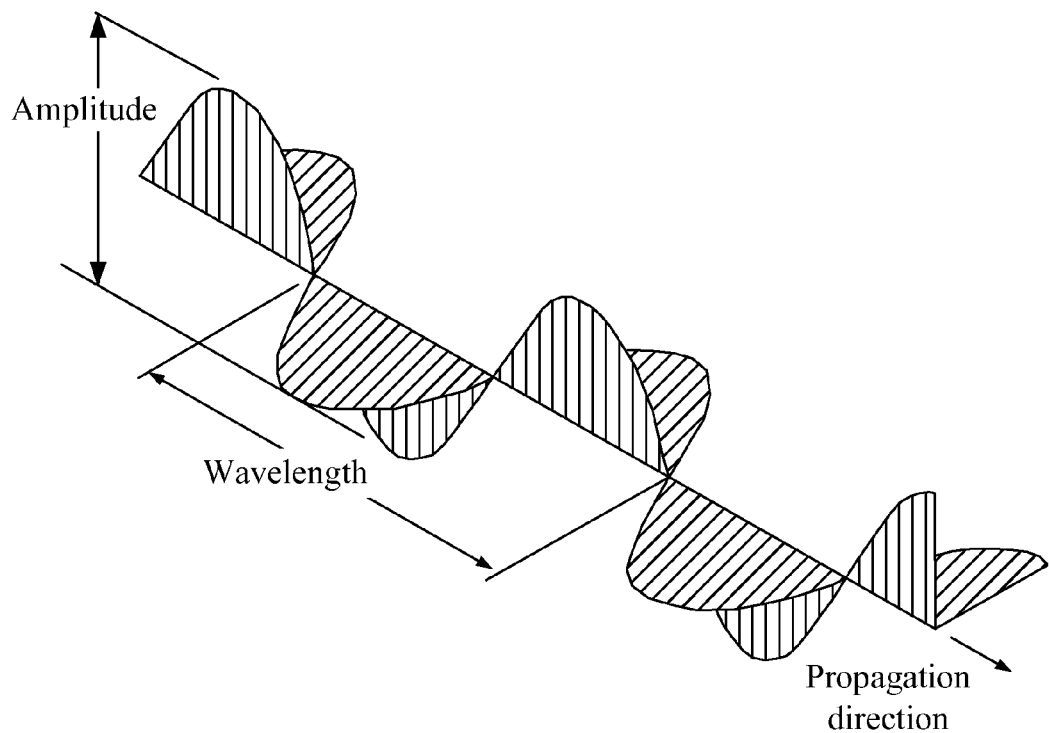
FIG. 2 is a schematic diagram of a SOP of an optical signal in the prior art.
Figure 3:
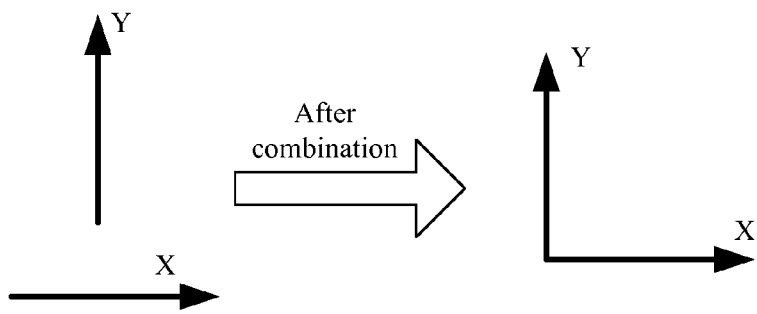
FIG. 3 is a schematic diagram of a SOP before and after an optical signal Y is combined with an optical signal X in the prior art.
Figure 4:
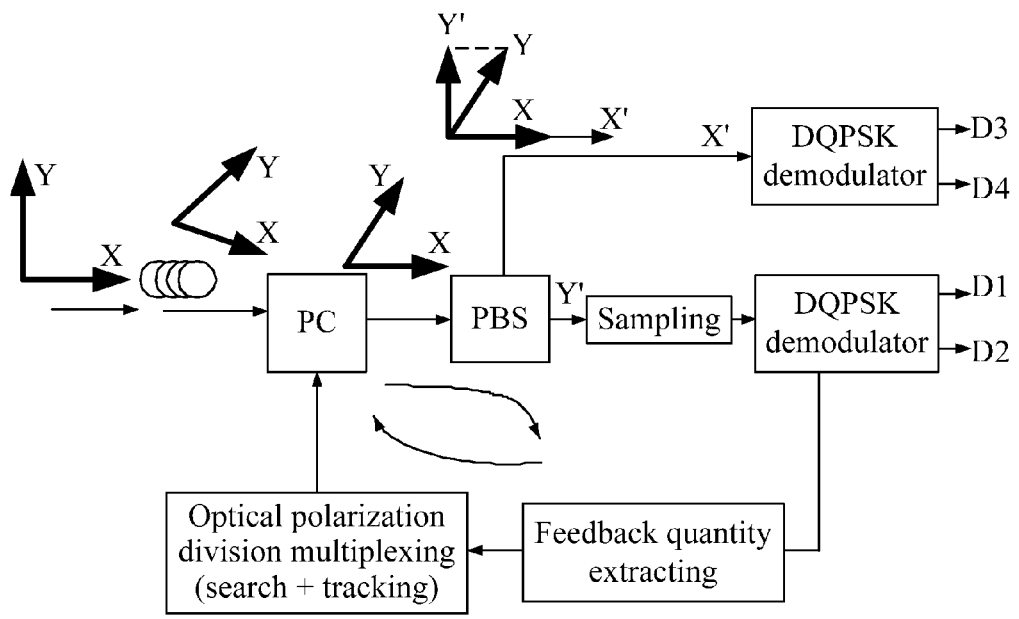
FIG. 4 is a schematic diagram of a change of SOP of a polarization-multiplexed optical signal in the prior art.

For details of the horizontal optical signal obtaining apparatus 52, see the feedback loop of the receiving end in FIG. 1 and FIG. 4. The difference is: The feedback quantity extracting module in FIG. 1 and FIG. 4 extracts either RF power or a pilot signal, but the feedback quantity extracting module in the horizontal optical signal obtaining apparatus 52 includes the first RF power extracting submodule and the first pilot extracting submodule, and extracts both the RF power and the pilot signal, where the extracted pilot signal is used to identify the first SOP optical signal, and the extracted RF power is used as a feedback quantity, so as to ensure that the optical signal separated by the horizontal optical signal obtaining apparatus 52 is only the horizontal-SOP optical signal.

It should be noted that any apparatus having the functions of the foregoing first PC, first polarized light separating apparatus, first optical splitter, first feedback quantity extracting module, and first search track module can implement the functions of the horizontal optical signal obtaining apparatus 52 shown in FIG. 5, and is namely other implementation manner of the horizontal optical signal obtaining apparatus 52. For example, the horizontal optical signal obtaining apparatus 52 may include a PC, a polarized light separating apparatus, an optical splitter, and a feedback control module. The feedback control module integrates the functions of the first feedback quantity extracting module and the functions of the first search track module. The optical splitter may also be replaced with a coupler or a splitter.

In the horizontal optical signal obtaining apparatus 52, the first RF power extracting submodule may be omitted. In this case, the pilot information extracted by the first pilot extracting submodule may be used to control the feedback quantity sent to the first PC, and may also be used to identify the SOP of the optical signal.

In the horizontal optical signal obtaining apparatus 52, the first pilot extracting submodule may also be replaced with an optical power extracting submodule. For example, at the sending end, a power value of the optical signal X is set much different from a power value of the optical signal Y, and then the optical power extracting submodule at the receiving end, namely, in the receiving apparatus, may extract and compare the power values of all optical signals, and identify the SOP of the optical signal according to a power difference.

The vertical optical signal obtaining apparatus 53 may include a second PC, a second polarized light separating apparatus, a second optical splitter, a second feedback quantity extracting module, and a second search track module, which make up a feedback loop. The second polarized light separating apparatus may be a PBS or a polarization detector.

The second PC is configured to adjust the SOP of the polarization-multiplexed optical signal until the second SOP optical signal in the polarization-multiplexed optical signal is adjusted to the horizontal direction.

The second polarized light separating apparatus is configured to separate the vertical-SOP optical signal from the adjusted polarization-multiplexed optical signal.

The second optical splitter is configured to split the optical signal separated by the second polarized light separating apparatus into two signals.

The second feedback quantity extracting module includes a second RF power extracting submodule and a second pilot extracting submodule. The second pilot extracting submodule is configured to extract a pilot signal from one optical signal separated by the first optical splitter; and the second RF power extracting submodule is configured to extract RF power from the other optical signal separated by the first optical splitter.

The second search track module is configured to identify the second SOP optical signal according to the pilot signal extracted by the second pilot extracting submodule, and control, according to an identification result and the RF power extracted by the second RF power extracting submodule, the second PC to adjust the SOP of the polarization-multiplexed optical signal.

The vertical optical signal obtaining apparatus 53 is similar to the feedback loop of the receiving end in FIG. 1 and FIG. 4. The difference is: The feedback quantity extracting module in FIG. 1 and FIG. 4 extracts either RF power or a pilot signal, but the feedback quantity extracting module in the vertical optical signal obtaining apparatus 53 includes the second RF power extracting submodule and the second pilot extracting submodule, and extracts both the RF power and the pilot signal, where the extracted pilot signal is used to identify the second SOP optical signal, and the extracted RF power is used as a feedback quantity, so as to ensure that the optical signal separated by the vertical optical signal obtaining apparatus 53 is only the vertical-SOP optical signal.

It should be noted that any apparatus having the functions of the foregoing second PC, second polarized light separating apparatus, second optical splitter, second feedback quantity extracting module, and second search track module can implement the functions of the vertical optical signal obtaining apparatus 53 shown in FIG. 5, and is namely other implementation manner of the vertical optical signal obtaining apparatus 53. For example, the vertical optical signal obtaining apparatus 53 may include a PC, a polarized light separating apparatus, an optical splitter, and a feedback control module. The feedback control module integrates the functions of the second feedback quantity extracting module and the functions of the second search track module. The optical splitter may be replaced with a coupler or a splitter.

In the vertical optical signal obtaining apparatus 53, the second RF power extracting submodule may be omitted. In this case, the pilot information extracted by the second pilot extracting submodule may be used to control the feedback quantity sent to the second PC, and may also be used to identify the SOP of the optical signal.

In the vertical optical signal obtaining apparatus 53, the second pilot extracting submodule may also be replaced with an optical power extracting submodule. For example, at the sending end, a power value of the optical signal X is set much different from the power value of the optical signal Y, and then the optical power extracting submodule at the receiving end, namely, in the receiving apparatus, may extract and compare the power values of all optical signals, and identify the SOP of the optical signal according to a power difference.

In the embodiment, the horizontal optical signal obtaining apparatus and the vertical optical signal obtaining apparatus both adjust the SOP of the optical signal orthogonal to the SOP of the optical signal to be separated to the before-sending state, so as to separate the single-SOP optical signal respectively, which mitigates the impact caused by PDL on the transmission link, reduces the crosstalk of optical signals, and improves the performance of the optical transmission system for optical polarization division multiplexing.

Figure 6:
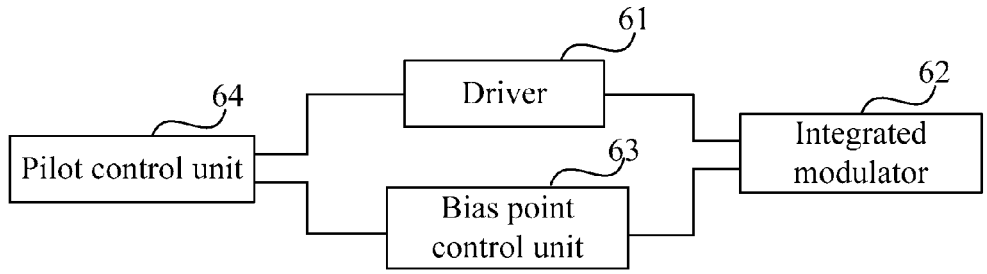
FIG. 6 is a schematic structural diagram of a sending apparatus for optical polarization division multiplexing provided by an embodiment of the present invention.

FIG. 6 is a schematic structural diagram of a sending apparatus for optical polarization division multiplexing provided an embodiment of the present invention. The sending apparatus includes: a driver 61, an integrated modulator 62, a bias point control unit 63, and a pilot control unit 64. The driver 61 is configured to amplify a data signal; the integrated modulator 62 is configured to modulate the amplified data signal onto an optical signal; the bias point control unit 63 is configured to control a working state of the integrated modulator 62; and the pilot control unit 64 is configured to send a pilot signal so as to enable at least one of the driver and the bias point control unit to load the pilot signal into the optical signal modulated by the integrated modulator 62.

The driver 61 may include a first driver and a second driver. The first driver is configured to amplify a group of data signals; and the second driver is configured to amplify another group of data signals.

The integrated modulator 62 may include an optical splitter, a horizontal-SOP optical signal modulator, a vertical-SOP optical signal modulator, and an optical combiner. The optical splitter is configured to split one optical signal into two optical signals; the horizontal-SOP optical signal modulator is configured to modulate one of the two optical signals into a horizontal-SOP optical signal, and load the group of the amplified data signals onto the horizontal-SOP optical signal; the vertical-SOP optical signal modulator is configured to modulate the other one of the two optical signals into a vertical-SOP optical signal, and load the other group of the amplified data signals onto the vertical-SOP optical signal; and the optical combiner is configured to combine the SOP optical signal in the horizontal direction and the vertical-SOP optical signal into one polarization-multiplexed optical signal, where data signals are loaded in the horizontal-SOP optical signal and vertical-SOP optical signal.

The bias point control unit 63 may include a first bias point control unit and a second bias point control unit. The first bias point control unit is configured to control the working state of the horizontal-SOP optical signal modulator; and the second bias point control unit is configured to control the working state of the vertical-SOP optical signal modulator.

In this embodiment, the pilot control unit uses at least one of the driver and the bias point control unit to load the pilot signal into the optical signal modulated by the integrated modulator. Therefore, the receiving apparatus for optical polarization division multiplexing can identify two SOP optical signals in the polarization-multiplexed optical signal; and it is ensured that the horizontal optical signal obtaining apparatus and the vertical optical signal obtaining apparatus that are in the receiving apparatus adjust the SOP of the optical signal orthogonal to the SOP of the optical signal to be separated to the before-sending state, so as to separate the single-SOP optical signal respectively, which mitigates the impact caused by PDL on the transmission link, reduces the crosstalk of optical signals, and improves the performance of the optical transmission system for optical polarization division multiplexing.

Figure 7:
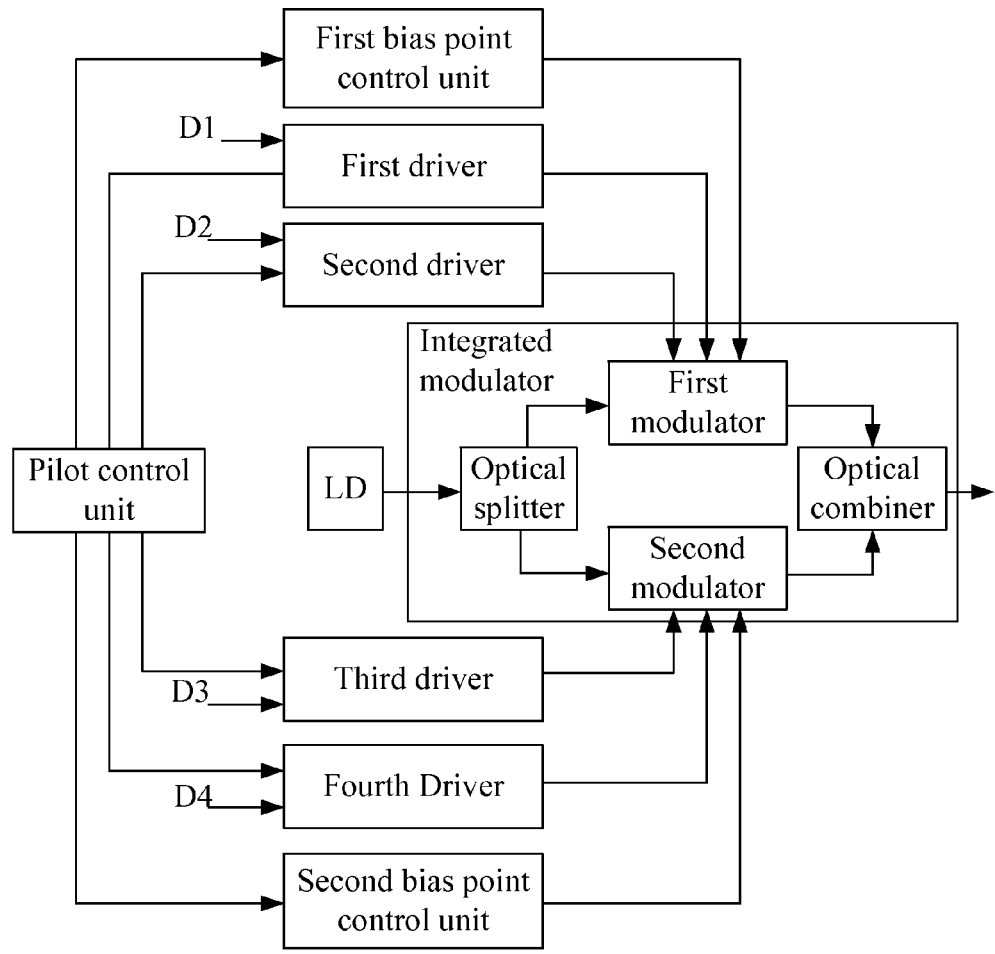
FIG. 7 is a schematic structural diagram of another sending apparatus for optical polarization division multiplexing provided by an embodiment of the present invention.

FIG. 7 is a schematic structural diagram of another sending apparatus for optical polarization division multiplexing provided an embodiment of the present invention. After a direct-current optical signal output by a laser diode (LD) is sent into an integrated modulator, the optical signal is modulated by an electric signal amplified by an amplifier, and a polarization-multiplexed optical signal is obtained. The integrated modulator includes an optical splitter, a first modulator, a second modulator, and an optical combiner. The received light is split by the optical splitter into a first optical signal and a second optical signal. The first optical signal is modulated by the first modulator into a first modulated optical signal; a second modulated optical signal is generated in the same way; and the first modulated optical signal and the second modulated optical signal are combined by the optical combiner into a polarization-multiplexed optical signal.

Four data signals D1, D2, D3 and D4 are amplified by a driver, and input into an integrated modulator, where D1 and D2 are input into the first modulator, and D3 and D4 are input into the second modulator. The first modulator modulates D1 and D2 amplified by the first driver and the second driver into a first modulated optical signal under the control of the first bias point control unit, and similarly, a second modulated optical signal is obtained.

The pilot control unit outputs a pilot signal to the driver or the bias point control unit. After the pilot control unit sends the pilot signal to the driver, the driver amplifies the pilot signal together with the input data signals, and then inputs the amplified pilot signal and input data signals to the modulator, and then the signals are modulated by the modulator and loaded into the optical signal. In this way, the optical signal obtained through the modulation carries pilot information. When the pilot control unit sends the pilot information to the bias point control unit, the bias point control unit sends the pilot information together with bias point control information into the modulator so that the modulated optical signal carries the pilot information. Either or both of the foregoing two pilot scrambling methods may be applied at a time. When pilot information is loaded through the driver, the pilot information may be loaded onto one channel of data or both channels of data.

In this solution, the pilot is loaded by using a driver module or a bias point control module of the modulator at the sending end, without increasing hardware cost additionally. This method is different from ordinary pilot loading techniques such as Electrical Variable Optical Attenuator (EVOA). Moreover, when an integrated modulator is applied at the sending end, pilot is necessarily loaded on the modulator. The receiving end mainly uses pilot signals to ensure that an upper branch outputs a vertical-SOP optical signal and a lower branch outputs a horizontal-SOP optical signal.

It should be noted that the sending apparatus for optical polarization division multiplexing provided in this embodiment of the present invention may also modulate multiple channels of data signals, such as 6 or 8 channels of data signals, onto the optical signal for sending out. For example, when 6 channels of data signals are sent, 3 channels of data signals may be modulated on each SOP optical signal; when 8 channels of data signals are sent, 4 channels of data signals may be modulated on each SOP optical signal. Accordingly, after obtaining each SOP optical signal, the receiving apparatus for optical polarization division multiplexing provided in this embodiment of the present invention may demodulate 3 channels of data signals or 4 channels of data signals from each SOP optical signal.

Figure 8:
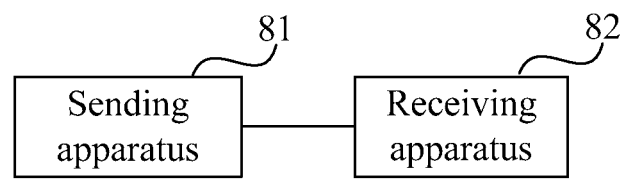
FIG. 8 is a schematic structural diagram of an optical transmission system for optical polarization division multiplexing provided by an embodiment of the present invention.

FIG. 8 is a schematic structural diagram of an optical transmission system for optical polarization division multiplexing provided by an embodiment of the present invention. The system includes a sending apparatus 81 and a receiving apparatus 82. The sending apparatus 81 may be the sending apparatus for optical polarization division multiplexing provided in the embodiment shown in the foregoing FIG. 6 or FIG. 7, and is configured to modulate a data signal onto an optical signal of a corresponding SOP, combine modulated optical signals into a polarization-multiplexed optical signal, and identify optical signals of different SOPs by loading a pilot signal. The receiving apparatus 82 may be the receiving apparatus for optical polarization division multiplexing provided by the embodiment shown in the foregoing FIG. 5, and is configured to separate the optical signal of the corresponding SOP through the feedback quantity RF and the pilot signal.

Figure 9:
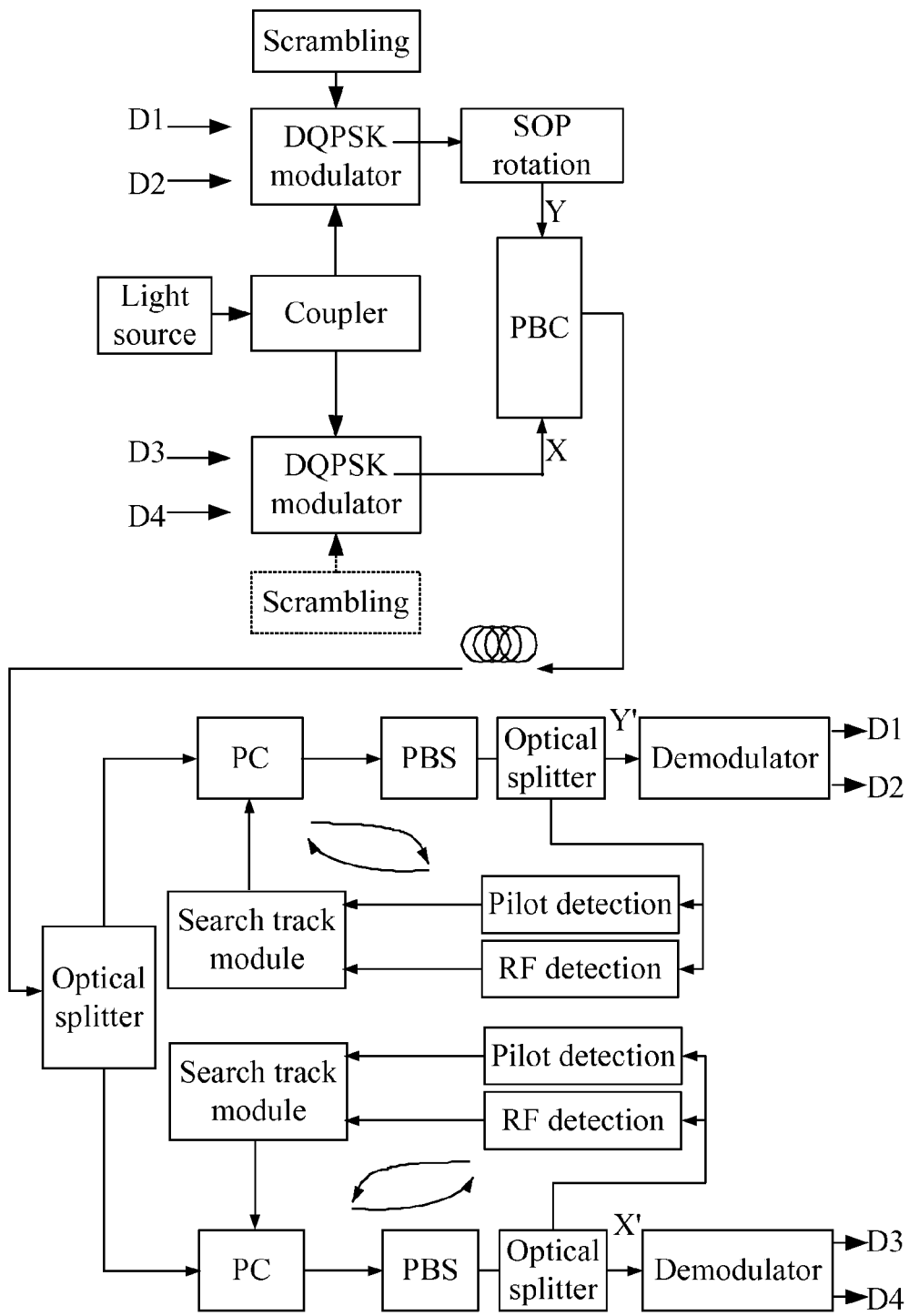
FIG. 9 is a schematic structural diagram of another optical transmission system for optical polarization division multiplexing provided by an embodiment of the present invention.

FIG. 9 is a schematic structural diagram of another optical transmission system for optical polarization division multiplexing provided by an embodiment of the present invention. In this embodiment, a sending end needs to send four data signals: D1, D2, D3, and D4, and every two data signals are modulated onto one optical signal through by DQPSK. At the time of modulation, the pilot information is scrambled for at least one of an optical signal Y and an optical signal X. For details, refer to FIG. 7 and the corresponding description. A SOP rotating module rotates the SOP of one optical signal to make the SOP of the one optical signal orthogonal to the SOP of the other optical signal. The PBC combines the two optical signals, the SOPs of which are orthogonal, and sends the combined two orthogonally SOP optical signals to an optical fiber link for transmission.

At a receiving end, an optical signal received by the optical transmission system for optical polarization division multiplexing is split by an optical splitter into two identical optical signals. The two identical optical signals are input into an upper feedback loop and a lower feedback loop respectively, and PCs in the upper and lower feedback loops under the control of a pilot feedback signal and an RF feedback signal rotate the SOPs of the optical signals that enter the loops. PBSs filter the rotated optical signals to obtain single-SOP optical signals. In other words, the PBS in the upper feedback loop restores a vertical-SOP optical signal Y', and the PBS in the lower feedback loop restores a horizontal-SOP optical signal X'.

The RF feedback signal is crosstalk power of the optical signal of a different SOP in the optical signals. That is, for the feedback loop in an apparatus for obtaining the optical signal Y', the RF feedback signal is crosstalk power of the optical signal X; for the feedback loop in an apparatus for obtaining the optical signal X', the RF feedback signal is crosstalk power of the optical signal Y. Search track modules in the upper feedback loop and the lower feedback loop control, on the basis of a minimum feedback quantity, the PCs in real time to make the feedback quantity minimum. That is, the search track modules make the optical signal output by the PBS be a single-SOP optical signal (optical signal Y' or optical signal X'). That is, when the optical signal is a single-SOP optical signal, the quantity value of the feedback signal is minimum. The function of the pilot feedback signal is to ensure that the upper branch outputs the optical signal Y' and the lower branch outputs the optical signal X'. The optical signal Y' and optical signal Y are optical signals having the same SOP, but the power of the optical signal Y' is slightly smaller than the power of the optical signal Y. The optical signal Y' also bears 56 Gb/s data borne by the optical signal Y. Similarly, the optical signal X' bears 56 Gb/s data borne by the optical signal X.

Figure 10:
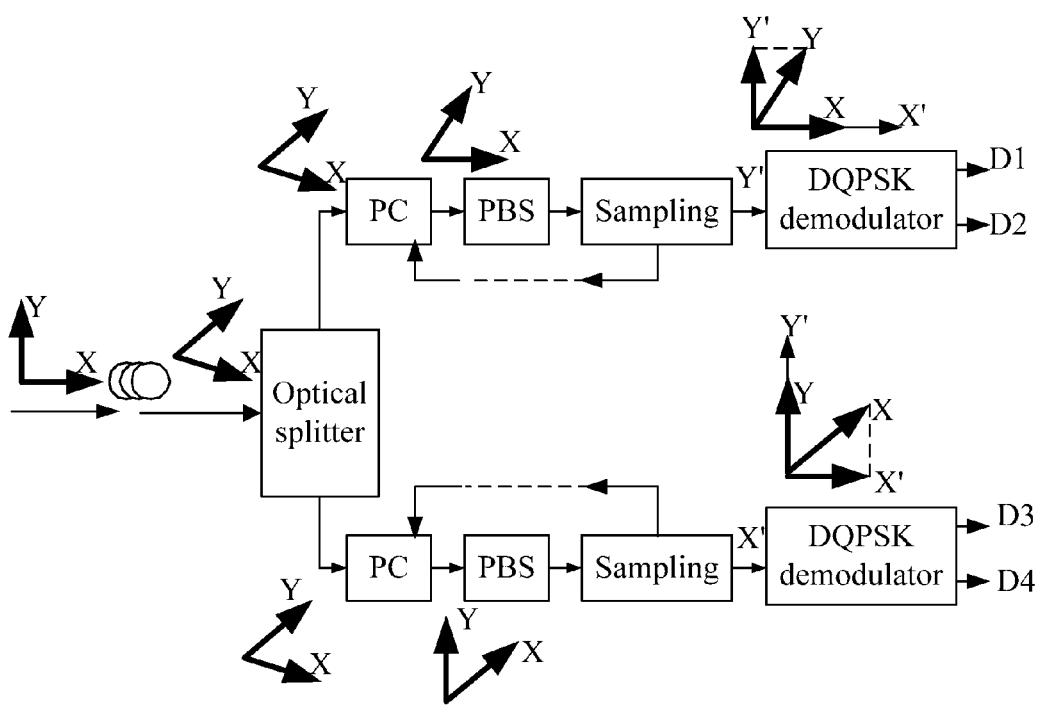
FIG. 10 is a schematic diagram of a change of a SOP of an optical signal at a receiving end in an optical transmission system for optical polarization division multiplexing provided by an embodiment of the present invention.

A change of the SOP of the optical signal at the receiving end is as shown in FIG. 10. In the polarization-multiplexed optical signals sent by the sending end, the SOP of the optical signal Y is vertically horizontally orthogonal to the SOP of the optical signal X (namely, an included angle between the optical signal Y and the optical signal X is 90 degrees). In the polarization-multiplexed optical signals transmitted through the optical fiber link to the receiving end, the SOP of the optical signal Y is not orthogonal to the SOP of the optical signal X due to transmission loss or impact. That is, the direction of the SOP of the optical signal X deviates from the horizontal direction, and the direction of the SOP of the optical signal Y deviates from the vertical direction. The optical splitter splits a polarization-multiplexed optical signal into two polarization-multiplexed optical signals, the upper feedback loop adjusts the SOP of one of the two polarization-multiplexed optical signals to make the SOP of the optical signal X rotate to the horizontal direction. In this way, it is ensured that the split optical signal Y' is only a component of the optical signal Y in the vertical direction, and the crosstalk of the optical signal X is avoided. Meanwhile, the lower feedback loop adjusts the SOP of the other one of the two polarization-multiplexed optical signals split by the optical splitter to make the SOP of the optical signal Y rotate to the vertical direction. In this way, the split optical signal X' is only the component of the optical signal X in the horizontal direction, and the crosstalk of the optical signal Y is avoided.

Figure 11:
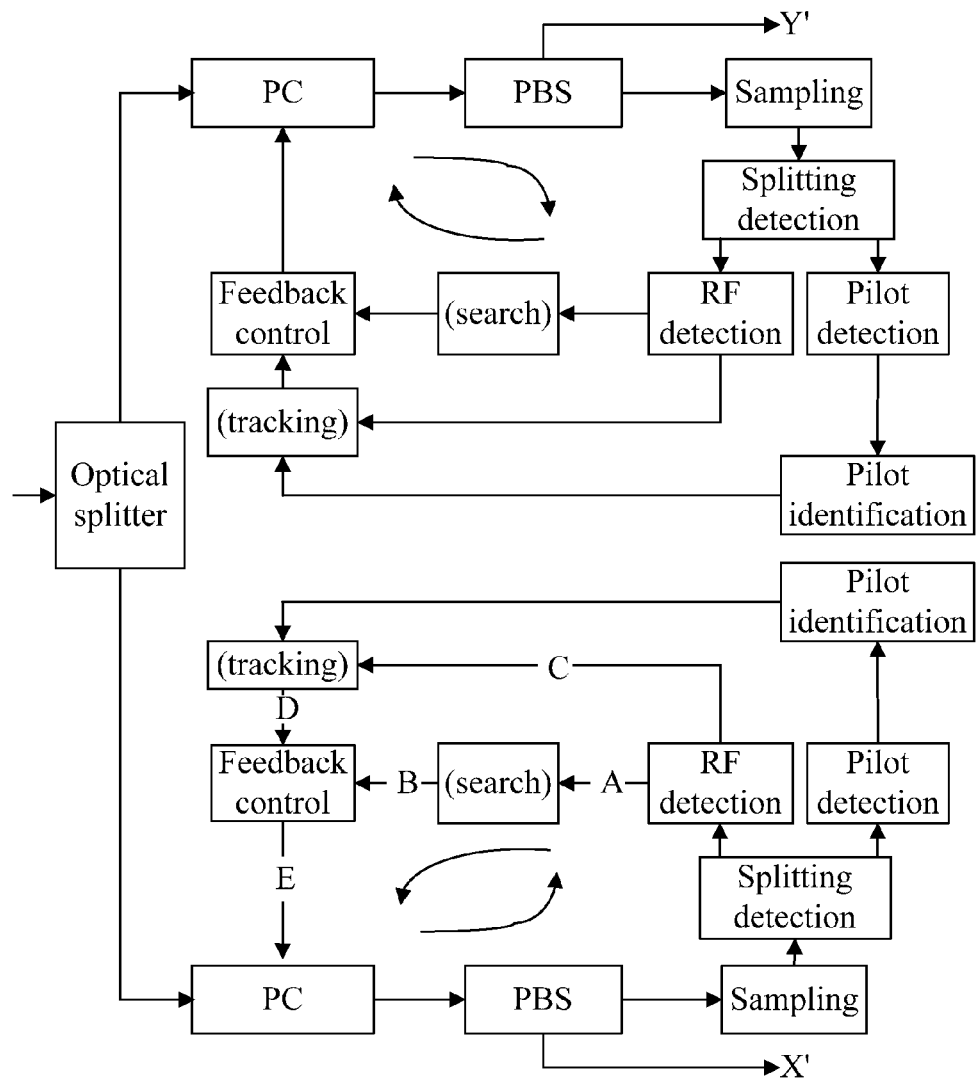
FIG. 11 is a block diagram of implementation principles of feedback control of the optical transmission system for optical polarization division multiplexing shown in FIG. 9.
Figure 12:
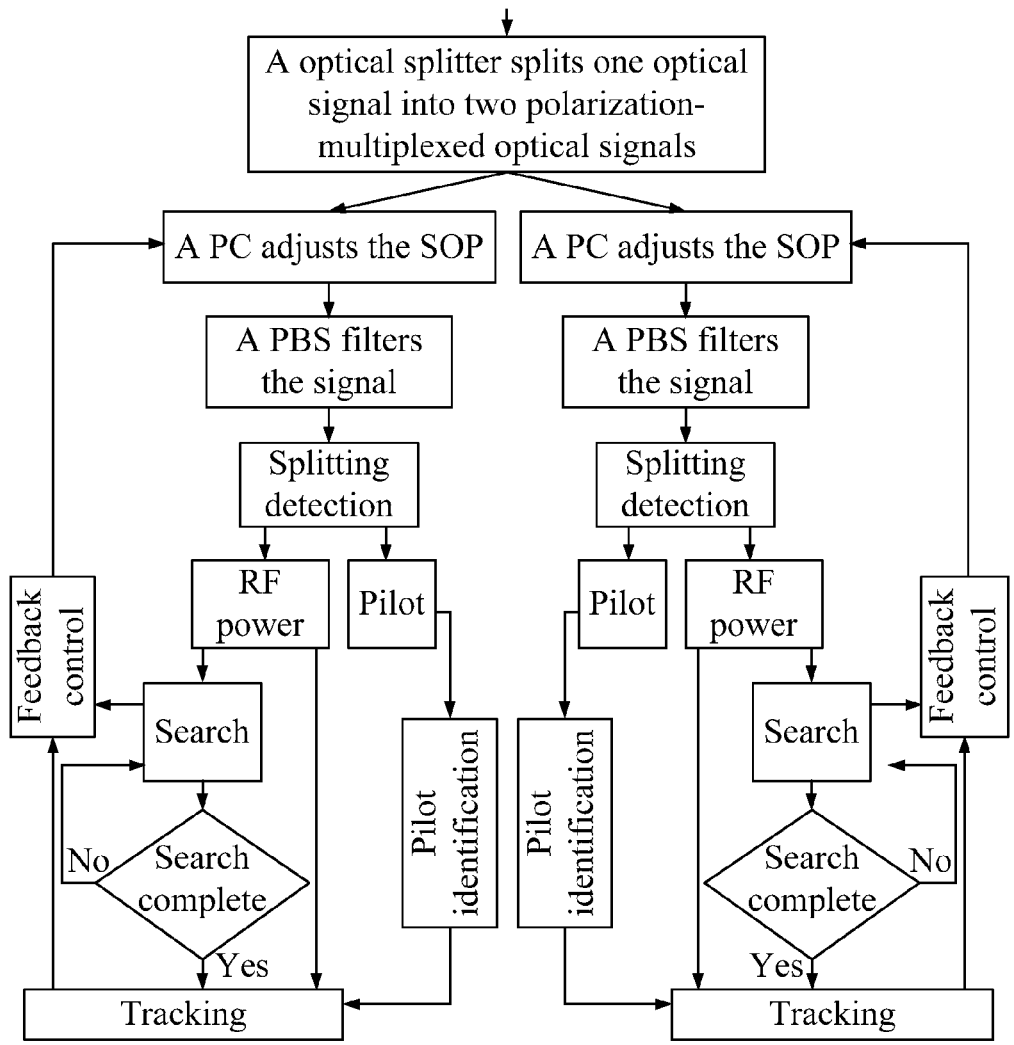
FIG. 12 is a schematic flowchart of feedback control of the optical transmission system for optical polarization division multiplexing shown in FIG. 9.

FIG. 11 is a block diagram of implementation principles of feedback control of the optical transmission system for optical polarization division multiplexing shown in FIG. 9; and FIG. 12 is a schematic flowchart of feedback control of the optical transmission system for optical polarization division multiplexing shown in FIG. 9. Sampling and splitting detection may be performed by two 1-into-2 optical splitters. One of the optical splitters outputs one beam used for sampling, and outputs the other beam which is used to be split by the other 1-into-2 optical splitter into two beams, and then the beams undergo RF detection and pilot detection respectively; or, the sampling and the splitting detection may be performed by a 1-into-3 optical splitter, and the three beams output by this optical splitter are used for sampling, RF detection, and pilot detection respectively.

Taking the feedback loop of the lower branch in FIG. 10 as an example, a control procedure of the feedback control is described below. The control procedure includes two stages: a search stage as the first stage, and a tracking stage as the second stage.

The procedure of the search stage is: search→find an optimal control quantity→feedback and output. Through the search, a relatively optimal global feedback control quantity is found. The feedback loop in the search stage is a search loop of A→B→E. A group of control quantities are output randomly to control a PC, a group of RF feedback quantities are obtained, and the smallest value in each group of feedback quantities is found. This procedure is repeated for multiple times, and when no smaller feedback quantity can be found, the search is complete, and a track loop of C→D→E is started.

The procedure of the tracking stage begins with the success of finding the optimal global control quantity: track→feedback and output; and continuous tracking is performed from a relatively optimal position to depolarize the SOP completely. The relatively optimal position refers to the optimal feedback quantity found in the search stage. The optimal feedback quantity is optimal in respect of the search stage, but the feedback quantity may be better in the tracking stage. For example, the RF feedback power is between 0.2V and 0.8V, and the feedback quantity found in the search stage is between 0.42V and 0.8V. Therefore, 0.42V is the relatively optimal value found in the search stage, and the PC control quantity corresponding to the optimal value is the relatively optimal position.

The feedback loop in the tracking stage, namely, tracking loop of C→D→E, uses a gradient algorithm to control the PC. The control quantity at the time of the initial tracking corresponds to the control quantity of the optimal feedback power found on the search loop of A→B→E. Taking 1-dimensional control as an example: First, the control quantity C=C0 is output, and the feedback RF power P=P0 is obtained; and then the control quantity C=C0+Pace is output, and the feedback RF power P=P1 is obtained; further, the control quantity C=C0-Pace is output, and the feedback RF power P=P2 is obtained. The change of the next-step control quantity is determined by comparing the value of the feedback power. If P1<P0, make the control quantity C=C0+Delta; if P1>P0 and P2<P0, make the control quantity C=C0 Delta; otherwise, keep C unchanged. P0 is the optimal feedback power found on the search loop; C0 is the control quantity output at the time of initial tracking of the tracking loop when the P0 is found on the search loop; Pace refers to the step length of jitters; Delta refers to the updated step length, and the value of Delta may also be decided by the system.

The tracking stage further includes pilot identification. The pilot identification part controls the tracking part directly. Whether an optical signal Y or an optical signal X is tracked on this branch is judged by detecting whether a pilot signal exists. The search stage is reentered if the detected pilot is different from expected. That is, if the pilot is added onto the optical signal Y, but no pilot is added onto the optical signal X, the upper branch tracks the optical signal Y, and the lower branch tracks the optical signal X, so that if no pilot signal is detected by the pilot identification on the upper branch, it indicates that the optical signal X is tracked, and the upper branch reenters the search stage; if pilot is detected by the pilot identification on the lower branch, it indicates that the optical signal Y is tracked, and the lower branch reenters the search stage, and the procedure is repeated in this way. The search track module controls, according to the pilot identification result, the search loop to resume search or not. In this way, it is ensured that the optical signal of the correct SOP is output, namely, the upper branch outputs the optical signal Y' and the lower branch outputs the optical signal X'.

In this way, the feedback loops in the upper branch and the lower branch use the RF feedback quantity as feedback information to adjust the PC to obtain the depolarized optical signal, and uses the pilot for adapting the SOP, so as to ensure that each branch outputs optical signals of fixed SOP.

The PBSs in the upper branch and the lower branch output single-SOP polarized light that carries 56 Gb/s data signals respectively. Two 28 Gb/s electric data signals are restored through a posterior demodulation receiving module.

Figure 13:
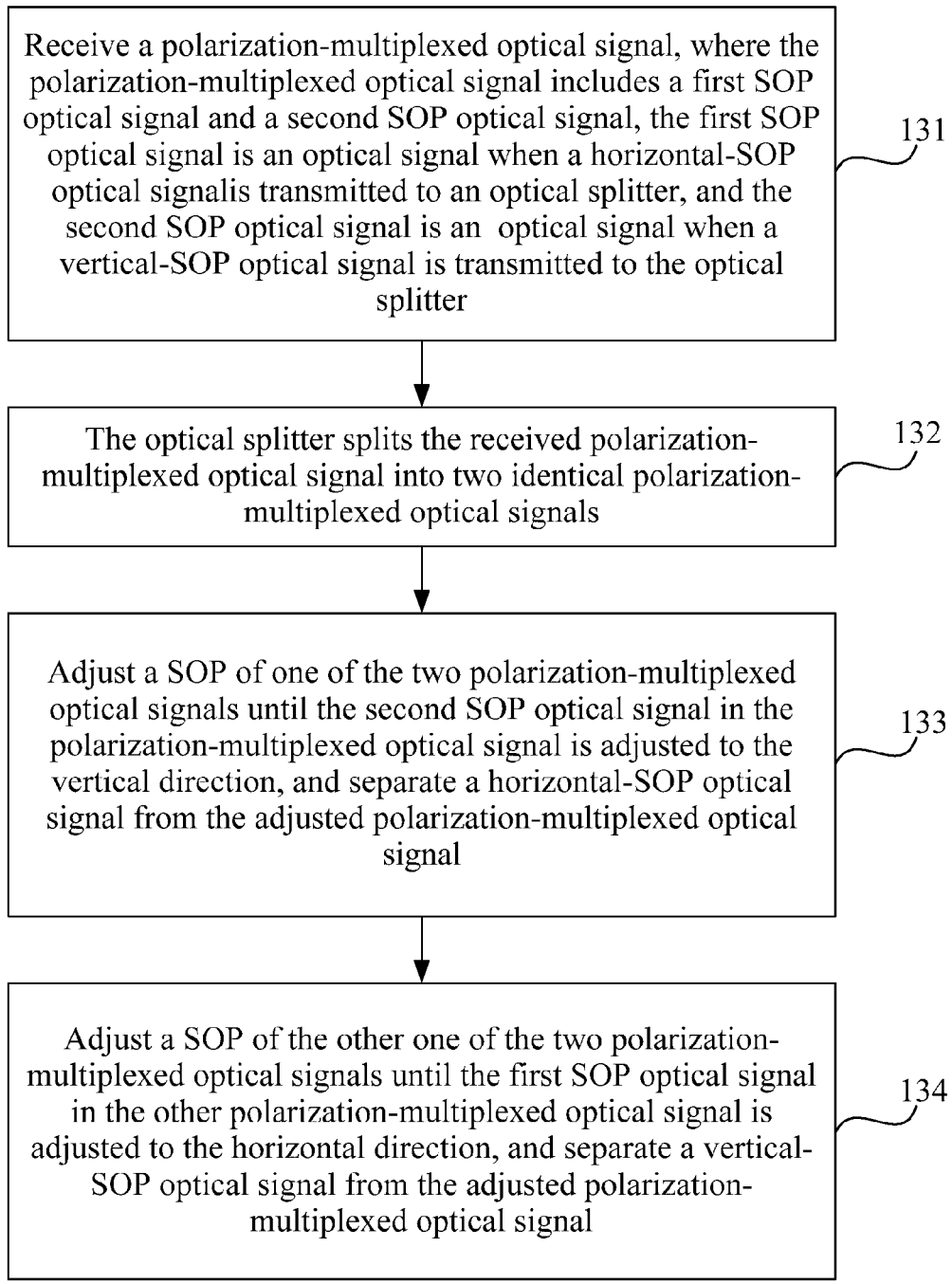
FIG. 13 is a flowchart of a receiving method for optical polarization division multiplexing provided by an embodiment of the present invention.

FIG. 13 is a flowchart of a receiving method for optical polarization division multiplexing provided by an embodiment of the present invention. The method includes:

Step 131: Receive a polarization-multiplexed optical signal. The polarization-multiplexed optical signal includes a first SOP optical signal and a second SOP optical signal, the first SOP optical signal is an optical signal when a horizontal-SOP optical signal is transmitted to an optical splitter, and the second SOP optical signal is an optical signal when a vertical-SOP optical signal is transmitted to the optical splitter. This action may be performed by an optical splitter. For details, see the description in the foregoing receiving apparatus embodiment.

Step 132: Split, by the optical splitter, the received polarization-multiplexed optical signal into two identical polarization-multiplexed optical signals. This action may be performed by an optical splitter. For details, see the description in the foregoing receiving apparatus embodiment.

Step 133: Adjust a SOP of one of the two polarization-multiplexed optical signals until the second SOP optical signal in the polarization-multiplexed optical signal is adjusted to the vertical direction, and separate a horizontal-SOP optical signal from the adjusted polarization-multiplexed optical signal. This action may be performed by a horizontal optical signal receiving apparatus. For details, see the description in the foregoing receiving apparatus embodiment.

Step 134: Adjust a SOP of the other one of the two polarization-multiplexed optical signals until the first SOP optical signal in the other polarization-multiplexed optical signal is adjusted to the horizontal direction, and separate a vertical-SOP optical signal from the adjusted polarization-multiplexed optical signal. This action may be performed by a vertical optical signal obtaining apparatus. For details, see the description in the foregoing receiving apparatus embodiment.

In the technical solution provided in this embodiment, the SOP of the optical signal orthogonal to the SOP of the optical signal to be separated is adjusted to the before-sending state, so as to separate the two single-SOP optical signals, which mitigates the impact caused by PDL on the transmission link, reduces the crosstalk of optical signals, and improves the performance of the optical transmission system for optical polarization division multiplexing.

The receiving method for optical polarization division multiplexing provided in this embodiment of the present invention may further include: extracting RF power and a pilot signal that is in the polarization-multiplexed optical signal so as to identify the single-SOP optical signal in the polarization-multiplexed optical signal, and ensure that the optical signal separated in the foregoing step 133 is oriented to the horizontal direction and that the optical signal separated in the foregoing step 134 is oriented to the vertical direction. Specifically, in the foregoing step 133, the separating the horizontal-SOP optical signal from the adjusted polarization-multiplexed optical signal may include: identifying the first SOP optical signal in the polarization-multiplexed optical signal according to the extracted pilot signal, and separating the horizontal-SOP optical signal according to the identification result and the RF power. In the foregoing step 134, the separating the vertical-SOP optical signal from the adjusted polarization-multiplexed optical signal may include: identifying the second SOP optical signal in the other polarization-multiplexed optical signal according to the extracted pilot signal, and separating the vertical-SOP optical signal according to the identification result and the RF power. For more details, see the description about the feedback loop in the foregoing receiving apparatus embodiment.

Figure 14:
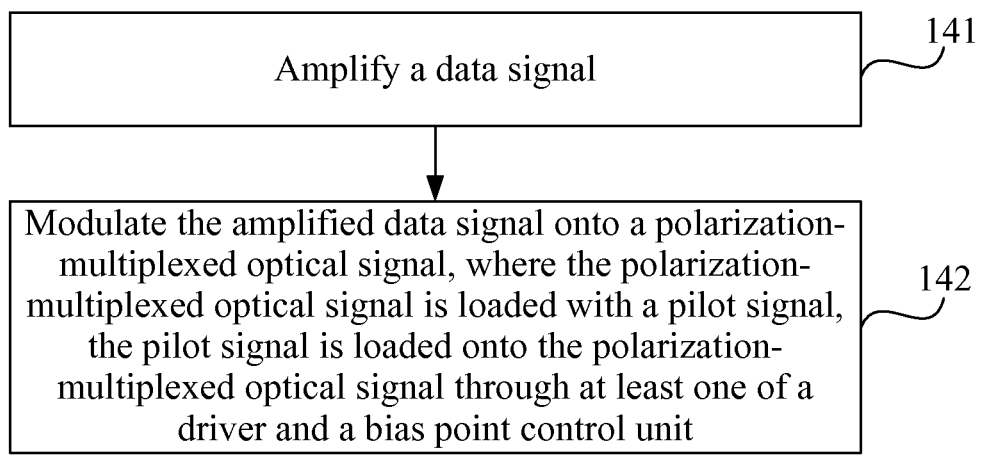
FIG. 14 is a flowchart of a sending method for optical polarization division multiplexing provided by an embodiment of the present invention.

FIG. 14 is a flowchart of a sending method for optical polarization division multiplexing provided by an embodiment of the present invention. The method includes:

Step 141: Amplify data signals. Specifically, two groups of data signals are amplified.

This action may be performed by a driver. For example, two drivers each amplify one group of data signals.

Step 142: Modulate the amplified data signals onto a polarization-multiplexed optical signal, where the polarization-multiplexed optical signal is loaded with a pilot signal, the pilot signal is loaded onto the polarization-multiplexed optical signal through at least one of a driver and a bias point control unit.

This action may be performed by an integrated modulator. For details, see the description in the foregoing sending apparatus embodiment.

When two groups of data signals are amplified in step 141, the modulating the amplified data signals onto the polarization-multiplexed optical signal may include:

loading one of the two groups of amplified data signals onto a horizontal-SOP optical signal;

loading the other one of the two group of amplified data signals onto a vertical-SOP optical signal; and combining the horizontal-SOP optical signal and the vertical-SOP optical signal into one polarization-multiplexed optical signal, where data signals are loaded in the horizontal-SOP optical signal and vertical-SOP optical signal. For more details, see the description in the foregoing sending apparatus embodiment.

In the technical solution provided by the present invention, at least one of the driver and the bias point control unit loads the pilot signal into the polarization-multiplexed optical signal. Therefore, the receiving apparatus for optical polarization division multiplexing can identify the two SOP optical signals in the polarization-multiplexed optical signal; and it is ensure that the horizontal optical signal obtaining apparatus and the vertical optical signal obtaining apparatus in the receiving apparatus adjust the SOP of the optical signal orthogonal to the SOP of the optical signal to be separated to the before-sending state, and separate the single-SOP optical signal respectively, which mitigates the impact caused by PDL on the transmission link, reduces the crosstalk of optical signals, and improves the performance of the optical transmission system for optical polarization division multiplexing.

The technical solution in the foregoing embodiments solves the problem of polarization switching through an optical module, without involving adjustment through an upper-layer service; the sending end uses a digital signal driver or a bias point control unit to exercise scrambling control to scramble the frequency information, namely, load the pilot signal without involving additional hardware. Therefore, the difficulty of scrambling in the integrated modulator is overcome. The receiving end ensures output of a single and fixed SOP through the RF and pilot information, and solves the signal crosstalk problem.

Persons of ordinary skill in the art should understand that all or part of the steps of the method in the embodiments of the present invention may be implemented by a program instructing relevant hardware. The program may be stored in a computer readable storage medium. When the program runs, the program executes the steps of the method in the embodiments of the present invention. The storage medium may be any medium capable of storing program codes, such as a ROM, a RAM, a magnetic disk, or a CD-ROM.

Finally, it should be noted that the foregoing embodiments are merely provided for describing the technical solutions of the present invention, but not intended to limit the present invention. Although the present invention is described in detail with reference to the foregoing embodiments, persons of ordinary skill in the art should understand that modifications to the technical solutions in the foregoing embodiments or equivalent replacements to part of the technical characteristics may still be made without departing from the spirit and scope of the invention. All these modifications and replacements shall fall within the protection scope defined by the following claims or their equivalents.

What is claimed is:

1. A receiving apparatus for optical polarization division multiplexing, comprising:

an optical splitter, configured to: split a received polarization-multiplexed optical signal into two identical polarization-multiplexed optical signals, wherein each of the two identical polarization-multiplexed optical signals comprises a first State Of Polarization (SOP) optical signal and a second SOP optical signal, and wherein the first SOP optical signal is an optical signal when a horizontal-SOP optical signal is transmitted to the optical splitter, and the second SOP optical signal is an optical signal when a vertical-SOP optical signal is transmitted to the optical splitter;

a horizontal optical signal obtaining apparatus, connected to the optical splitter, and configured to: adjust a SOP of one of the two identical polarization-multiplexed optical signals until the second SOP optical signal in the polarization-multiplexed optical signal is adjusted to the vertical direction, and separate a horizontal-SOP optical signal from the adjusted polarization-multiplexed optical signal; and a vertical optical signal obtaining apparatus, connected to the optical splitter, and configured to: adjust a SOP of the other one of the two identical polarization-multiplexed optical signals until the first SOP optical signal in the polarization-multiplexed optical signal is adjusted to the horizontal direction, and separate a vertical-SOP optical signal from the adjusted polarization-multiplexed optical signal, wherein:

the horizontal optical signal obtaining apparatus comprises a first Polarization Controller (PC), a first polarized light separating apparatus, a first optical splitter, a first feedback quantity extracting module, and a first search track module, which make up a feedback loop;

the first PC is configured to adjust the SOP of the polarization-multiplexed optical signal until the second SOP optical signal in the polarization-multiplexed optical signal is adjusted to the vertical direction;

the first polarized light separating apparatus is configured to separate the horizontal-SOP optical signal from the adjusted polarization-multiplexed optical signal;

the first optical splitter is configured to split the optical signal separated by the first polarized light separating apparatus into two signals;

the first feedback quantity extracting module comprises: a first radio frequency (RF) power extracting submodule and a first pilot extracting submodule; the first pilot extracting submodule is configured to extract a pilot signal from one optical signal separated by the first optical splitter; and the first RF power extracting submodule is configured to extract RF power from the other optical signal separated by the first optical splitter; and the first search track module is configured to identify the first SOP optical signal according to the pilot signal extracted by the first pilot extracting submodule, and control, according to an identification result and the RF power extracted by the first RF power extracting submodule, the first PC to adjust the SOP of the polarization-multiplexed optical signal.

2. A receiving apparatus for optical polarization division multiplexing, comprising:

an optical splitter, configured to: split a received polarization-multiplexed optical signal into two identical polarization-multiplexed optical signals, wherein each of the two polarization-multiplexed optical signals comprises a first State Of Polarization (SOP) optical signal and a second SOP optical signal, and wherein the first SOP optical signal is an optical signal when a horizontal-SOP optical signal is transmitted to the optical splitter, and the second SOP optical signal is an optical signal when a vertical-SOP optical signal is transmitted to the optical splitter;

a horizontal optical signal obtaining apparatus, connected to the optical splitter, and configured to: adjust a SOP of one of the two identical polarization-multiplexed optical signals until the second SOP optical signal in the polarization-multiplexed optical signal is adjusted to the vertical direction, and separate a horizontal-SOP optical signal from the adjusted polarization-multiplexed optical signal; and a vertical optical signal obtaining apparatus, connected to the optical splitter, and configured to: adjust a SOP of the other one of the two identical polarization-multiplexed optical signals until the first SOP optical signal in the polarization-multiplexed optical signal is adjusted to the horizontal direction, and separate a vertical-SOP optical signal from the adjusted polarization-multiplexed optical signal, wherein:

the vertical optical signal obtaining apparatus comprises a second PC, a second polarized light separating apparatus, a second optical splitter, a second feedback quantity extracting module, and a second search track module, which make up a feedback loop;

the second PC is configured to adjust the SOP of the polarization-multiplexed optical signal until the second SOP optical signal in the polarization-multiplexed optical signal is adjusted to the horizontal direction;

the second polarized light separating apparatus is configured to separate the vertical-SOP optical signal from the adjusted polarization-multiplexed optical signal;

the second optical splitter is configured to split the optical signal separated by the second polarized light separating apparatus into two signals;

the second feedback quantity extracting module comprises: a second RF power extracting submodule and a second pilot extracting submodule; the second pilot extracting submodule is configured to extract a pilot signal from one optical signal separated by the first optical splitter; and the second RF power extracting submodule is configured to extract RF power from the other optical signal separated by the first optical splitter; and the second search track module is configured to identify the second SOP optical signal according to the pilot signal extracted by the second pilot extracting submodule, and control, according to an identification result and the RF power extracted by the second RF power extracting submodule, the second PC to adjust the SOP of the polarization-multiplexed optical signal.

3. The receiving apparatus for optical polarization division multiplexing according to claim 1, wherein:

the vertical optical signal obtaining apparatus comprises a second PC, a second polarized light separating apparatus, a second optical splitter, a second feedback quantity extracting module, and a second search track module, which make up a feedback loop;

the second PC is configured to adjust the SOP of the polarization-multiplexed optical signal until the second SOP optical signal in the polarization-multiplexed optical signal is adjusted to the horizontal direction;

the second polarized light separating apparatus is configured to separate the vertical-SOP optical signal from the adjusted polarization-multiplexed optical signal;

the second optical splitter is configured to split the optical signal separated by the second polarized light separating apparatus into two signals;

the second feedback quantity extracting module comprises: a second RF power extracting submodule and a second pilot extracting submodule; the second pilot extracting submodule is configured to extract a pilot signal from one optical signal separated by the first optical splitter; and the second RF power extracting submodule is configured to extract RF power from the other optical signal separated by the first optical splitter; and the second search track module is configured to identify the second SOP optical signal according to the pilot signal extracted by the second pilot extracting submodule, and control, according to an identification result and the RF power extracted by the second RF power extracting submodule, the second PC to adjust the SOP of the polarization-multiplexed optical signal.

4. A method for optical polarization division multiplexing, comprising:

receiving a polarization-multiplexed optical signal, wherein the polarization-multiplexed optical signal comprises a first State Of Polarization (SOP) optical signal and a second SOP optical signal, wherein the first SOP optical signal is an optical signal when a horizontal-SOP optical signal is transmitted to an optical splitter, and the second SOP optical signal is an optical signal when a vertical-SOP optical signal is transmitted to the optical splitter;

splitting, by the optical splitter, the received polarization-multiplexed optical signal into two identical polarization-multiplexed optical signals;

adjusting a SOP of one of the two identical polarization-multiplexed optical signals until the second SOP optical signal in the one polarization-multiplexed optical signal is adjusted to the vertical direction, and separating a horizontal-SOP optical signal from the adjusted polarization-multiplexed optical signal;

adjusting a SOP of the other one of the two identical polarization-multiplexed optical signals until the first SOP optical signal in the other polarization-multiplexed optical signal is adjusted to the horizontal direction, and separating a vertical-SOP optical signal from the adjusted polarization-multiplexed optical signal;

extracting radio frequency (RF) power and a pilot signal that is in the polarization-multiplexed optical signal;

wherein:

the separating the horizontal-SOP optical signal from the adjusted polarization-multiplexed optical signal comprises:

identifying the first SOP optical signal in the polarization-multiplexed optical signal according to the extracted pilot signal, and separating the horizontal-SOP optical signal according to an identification result and the RF power;

the separating the vertical-SOP optical signal from the adjusted polarization-multiplexed optical signal comprises:

identifying the second SOP optical signal in the polarization-multiplexed optical signal according to the extracted pilot signal, and separating the vertical-SOP optical signal according to the identification result and the RF power.

\* \* \* \* \*